United States Patent [19]

Hazony et al.

[11] Patent Number: 5,612,930
[45] Date of Patent: Mar. 18, 1997

[54] ULTRASONIC TRANSDUCER

[75] Inventors: Dov Hazony, University Heights; Richard E. Berris, Jr., Chagrin Falls, both of Ohio

[73] Assignee: J. W. Harley Inc., Twinsburg, Ohio

[21] Appl. No.: 502,131

[22] Filed: Jul. 13, 1995

[51] Int. Cl.⁶ ................................................. H04R 15/00
[52] U.S. Cl. .................... 367/140; 310/336; 310/348; 310/351; 381/173; 381/190
[58] Field of Search .................................. 310/334, 336, 310/348, 351, 352; 367/140; 381/169, 173, 190

[56] References Cited

U.S. PATENT DOCUMENTS 5,280,724  1/1994  Higo et al. ................................. 73/624

*Primary Examiner*—J. Woodrow Eldred
*Attorney, Agent, or Firm*—James A. Hudak

[57] ABSTRACT

In ultrasonic transducer which can be utilized to detect partial electrical discharges and oil-filled devices is disclosed. The transducer includes a housing, a piezoelectric crystal assembly received within the housing and positioned so that the piezoelectric element contacts the base surface of the housing, and a retaining member which grippingly engages the housing and applies a compressive force to the piezoelectric crystal assembly. The retaining member includes a hub portion and a plurality of angularly spaced-apart arms extending radially outwardly from the hub portion. The arms are positioned with respect to the hub portion so as to grippingly engage the inner surface Of the housing and causing the retaining member to apply a compressive force to the piezoelectric crystal assembly.

11 Claims, 1 Drawing Sheet

5,612,930

ULTRASONIC TRANSDUCER

TECHNICAL FIELD

The present invention relates, in general, to apparatus which can be utilized to detect partial electrical discharges in electrical devices and, more particularly, to an ultrasonic transducer for detecting and monitoring partial electrical discharges in oil-filled devices, such as transformers.

BACKGROUND ART

Numerous devices and/or apparatus are available for detecting and/or monitoring partial electrical discharges in oil-filled devices. Such electrical discharges are detrimental since they weaken the insulation within the device resulting in the eventual failure of same. Thus, it is extremely beneficial, from both a service and an economic point of view, to detect such discharges and to monitor their frequency of occurrence.

An example of such a detection device is disclosed in U.S. Pat. No. 3,728,619 (Harold, et al) which is directed to apparatus for determining the position of corona discharges within a transformer. Typically, a corona discharge is indicative of the occurrence of a partial electrical discharge. In this reference transducer apparatus is attached to the wall of the transformer housing at a position where the ultrasonic wave created by the corona discharge may be detected. The apparatus contains two transducers which are aligned with each other in a pre-determined relationship. The apparatus is oriented so that the ultrasonic waves being detected by each transducer have a maximum amplitude and are in phase with each other. The distance between the corona source and the transducer apparatus is determined by (1) rotating the transducer apparatus a pre-determined number of degrees, (2) measuring the phase shift produced by the rotation, and (3) calculating the distance to the corona discharge using known constants and derived quantities.

The Umemura, et al reference (U.S. Pat. No. 5,075,629) discloses a partial electrical discharge detecting device for transformers which includes an antenna mounted adjacent to and exteriorly of the transformer. An electromagnetic wave resulting from the partial electrical discharge is detected by the antenna. The resulting signal produced by the antenna is supplied to a frequency spectrum analyzer to determine the existence of the electromagnetic wave. Processing circuitry is provided to determine whether or not a partial electrical discharge has occurred based upon the detected signal.

The Bruhlmeier, et al reference (U.S. Pat. No. 5,252,927) discloses a device for detecting partial electrical discharges within the windings of an electrical machine. In this case, the windings have a voltage applied thereto which is sampled over the length of the windings by means of a probe. The radio frequency signals resulting from the partial electrical discharges are received by an antenna affixed to the probe. The signals are then detected and evaluated in test equipment located in an area external to the electrical machine.

The Nishizawa, et al reference (U.S. Pat. No. 5,233,305) discloses a device for detecting partial electrical discharges which are induced the primary winding of a resin-molded transformer. In this case, the detecting sensor is connected between the transformer tap terminals and the output of the sensor is applied through amplifier circuitry to apparatus which provides an indication as to whether a partial electrical discharge has occurred.

Each of the foregoing apparatus and/or methods requires the use of either a sensor, detector or probe and a relatively complex apparatus requiring the use of rather sophisticated circuitry in order to determine whether a partial electrical discharge has occurred within the electrical device. In addition, none of the foregoing apparatus has the capability of transmitting an interrogating signal into the electrical device, and receiving a return signal from a surface or object within the device. In effect, all of the foregoing apparatus can operate only in the receive mode, and do not include any provisions for operating in the transmit mode and/or the receive and transmit modes.

In view of the foregoing, it has become desirable to develop an inexpensive ultrasonic transducer which can accurately detect and monitor partial electrical discharges in electrical devices and which can operate in the receive mode, the transmit mode and in the receive and transmit modes.

SUMMARY OF THE INVENTION

The present invention solves the problems associated with prior art devices for the detection and/or monitoring of partial electrical discharges in electrical devices by providing an ultrasonic transducer having a relatively simple, inexpensive structure and having the capability to operate in the receive mode, the transmit mode and in the receive and transmit modes. The ultrasonic transducer of the present invention is comprised of a housing, a piezoelectric crystal assembly received within in the housing and positioned so that the piezoelectric element contacts the bottom surface of the housing, and a retaining member which grippingly engages the housing and applies a compressive force to the piezoelectric crystal assembly. The retaining member is comprised for a hub portion and a plurality of angularly spaced-apart arms extending radially outwardly from the hub portion. The configuration of the retaining member is complementary to the inner configuration of the housing and slightly larger thereof. The plane of each arm of the retaining member forms an acute angle with respect to the plane of the hub portion of the member, and the arms are oriented in a direction opposite to the direction of insertion of the retaining member into the housing. The orientation of the arms causes the ends thereof to grippingly engage the inner surface of the housing preventing the easy removal of the piezoelectric crystal assembly from the housing. In addition, the orientation of the arms causes the retaining member to apply a compressive force to the piezoelectric element resulting in the bottom surface of the piezoelectric element firmly engaging the surface defining the base portion of the housing. In this manner, a firm electrical and acoustical contact is formed between the bottom surface of the piezoelectric element and the surface defining the base portion of the housing.

The retaining member acts as a support surface for any electronic components which are associated with and received within the transducer. After the electronic components are received in the housing and positioned therein so as to be supported by the retaining member, the housing is filled with potting or epoxy material to protect the electronic components and to absorb any acoustic signals which might pass through the housing. The potting or epoxy material substantially hermetically seals the transducer assembly permitting it to be subjected to aggressive environments, high temperatures and high pressures without any adverse effects on the electronic components within the transducer or on the operation of same.

DESCRIPTION OF THE PREFERRED EMBODIMENT

Figure 1:
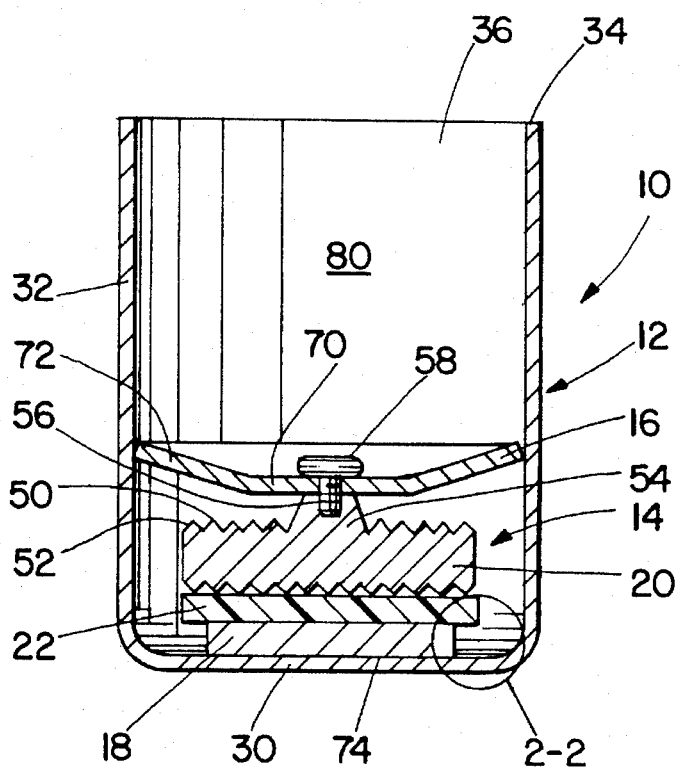
FIG. 1 is a cross-sectional view of the ultrasonic transducer of the present invention.

Referring now to the drawings where the illustrations are for the purpose of describing the preferred embodiment of the present invention and are not intended to limit the invention described herein, FIG. 1 is a cross-sectional view of the transducer 10 of the present invention. The transducer 10 is comprised of a housing 12, a piezoelectric crystal assembly, shown generally by the numeral 14, received within the housing 12, and a retaining member 16 which grippingly engages the inner surface of the housing 12 and applies a compressive force to the piezoelectric crystal assembly 14. The assembly 14 includes a piezoelectric element 18, a backing member 20 and an insulator 22 interposed between the backing member 20 and the piezoelectric element 18. The retaining member 16 applies a compressive force to the backing member 20 which, in turn, applies a compressive force to the piezoelectric element 18 through the insulator 22. Alternatively, additional layers of absorbing and/or impedance matching material (not shown) may be interposed between piezoelectric element 18 and insulator 22 and/or between insulator 22 and backing member 20.

Figure 3:
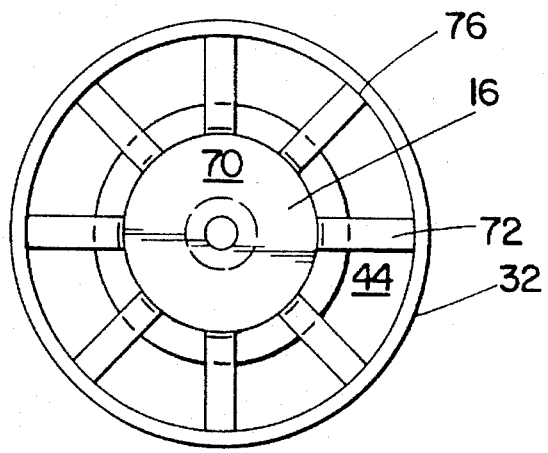
FIG. 3 is a top plan view of the ultrasonic transducer of the present invention.

The housing 12 can be formed as a deep-drawn, easy to seal, metal stamping and is usually cylindrical in configuration, however, it can have any geometrical shape, symmetrical or asymmetrical. The housing 12 provides a transmission path for acoustic signals from its base portion 30 to the piezoelectric crystal assembly 14 and affords the contents of the housing with a degree of electro-magnetic and acoustic shielding from stray fields to which the transducer 10 might be exposed. The housing 12 is closed at one end by base portion 30 which may be flat or curved and which terminates in a longitudinally extending portion 32 that is substantially perpendicular to base portion 30. The junction between the base portion 30 and the longitudinally extending portion 32 of the housing 12 is curved and continuous without any abrupt change in shape. The oppositely disposed end 34 of housing 12 has an opening 36 therein. One end of a wire 38 is attached to a conductive coating 40 deposited on the top surface 42 of the piezoelectric element 18. The opposite end of wire 38 passes through the housing 12 via an opening 44 provided in retaining member 16, as shown in FIG. 3. After electronic components are placed within the housing 12, as hereinafter described, the housing 12 is potted with epoxy material, or the like, to protect the components and to absorb any acoustic signals which might pass through housing 12. In this manner the housing 12 is substantially hermetically sealed permitting it to be subjected to aggressive environments, high temperatures and high pressures without any adverse effects on its contents or on the operation of the transducer 10.

The piezoelectric crystal assembly 14 is constructed so as to be capable of operating in (1) the receive mode, (2) the transmit mode, and (3) the receive and transmit mode. When in the receive mode of operation, the piezoelectric crystal assembly 14 receives acoustic signals which impinge upon the base portion 30 of the housing 12. Other signals which impinge upon the longitudinally extending portion 32 of the housing 12 are absorbed, dissipated or highly attenuated by the transducer 10. In the receive mode of operation, the piezoelectric element 18 converts pressure signals within the medium in which the transducer 10 is immersed into voltage signals which are transmitted through wire 38 to detection apparatus (not shown) which may be located within or externally to transducer 10. If the transducer 10 is placed within an oil-filled transformer, the pressure signals intercepted by the transducer 10 might be produced by partial electrical discharges which occur within the oil in the transformer. When the piezoelectric crystal assembly 14 is in the transmit mode of operation, piezoelectric element 18 is responsive to a short voltage signal, via wire 38, and converts the voltage signal into a pressure signal which is transmitted into the medium in which the transducer 10 is immersed. In this latter case, the piezoelectric element 18 can also operate in the receive mode and convert the "echo" return pressure signal from any material or member within the medium into a voltage signal for detection by apparatus located within or externally to transducer 10.

Figure 2:
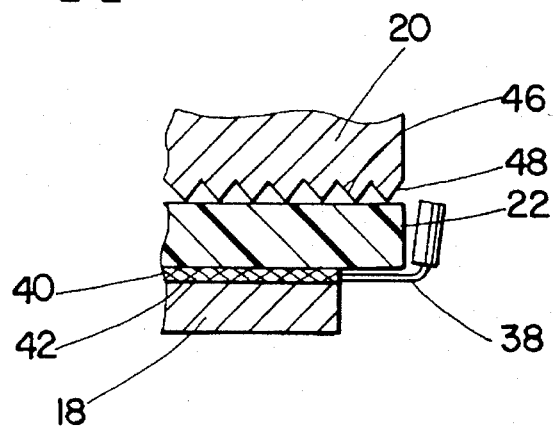
FIG. 2 is an enlarged cross-sectional view of a portion of FIG. 1 and illustrates the piezoelectric element, the electrical conductor attached to the piezoelectric element, the backing member and the insulator which is interposed between the backing member and the piezoelectric element.

Referring now to FIG. 2, which is an enlarged partial cross-sectional view of the piezoelectric element 18, the insulator 22 and the backing member 20, it should be noted that the backing member 20 is typically formed from a metallic material, such as brass, and may have a plurality of grooves 46 formed in both the bottom surface 48 and in the top surface 52 thereof, as shown in FIG. 1, to dissipate any spurious acoustic signals which are intercepted by or impinge upon the housing 12. The retaining member 16 is attached to the top surface 52 of backing member 20 by standard fastening techniques. For example, the top surface 52 of the backing member 20 may be provided with a raised boss 54 substantially in the center thereof and a threaded blind bore 56 substantially in the center of the boss 54. In this case, a screw 58 would be received through the retaining member 16 and threadingly engage threaded blind bore 56 in backing member 20. Many other standard fastening techniques can be utilized to attach retaining member 16 to the piezoelectric crystal assembly 14.

Referring now to FIG. 3, a top plan view of retaining member 16 is illustrated. Retaining member 16 is typically formed from spring steel material and is comprised of a hub portion 70 and a plurality of angularly spaced-apart arms 72 extending radially outwardly from hub portion 70 forming openings 44 therebetween. The configuration of retaining member 16 is complementary to the inner configuration of the housing 12 and slightly larger thereof. As shown in FIG. 1, the plane of each arm 72 forms an acute angle with respect to the plane of the hub portion 70 of the retaining member 16, and the arms 72 are oriented in a direction opposite to the direction of insertion of the retaining member 16 into the housing 12, as hereinafter described. Alternatively, the arms 72 can be replaced by a continuous surface emanating from the periphery of the hub portion 70 and in a plane forming an acute angle with the plane of the hub portion 70 and oriented in a direction opposite to the direction of insertion of the retaining member 16 into the housing 12.

In order to assemble the transducer 10, the piezoelectric element 18, along with the wire 38 connected to the conductive coating 40 on the top surface 42 thereof, is received within the housing 12 so that the bottom surface 74 of piezoelectric element 18 firmly contacts the surface defining the base portion 30 of the housing 12. The insulator 22 is then received within the housing 12 and positioned on the piezoelectric element 14 so that a firm electrical contact results therebetween. The retaining member 16 is then attached to the backing member 20 by standard fastening techniques, such as screw 58 received through an aperture in hub portion 70 of retaining member 16 to threadingly engage threaded blind bore 56 in boss 54 in backing member 20. The backing member 20 with the retaining member 16 attached thereto is then inserted into housing 12. Since the retaining member 16 is slightly larger than the housing 12 and since the plane of each arm 72 forms an acute angle with respect to the plane of the hub portion 70 of the retaining member 16, the arms 72 deflect slightly away from the direction of insertion of the retaining member 16 into the housing 12 causing the ends 76 of the arms to grippingly engage the inner surface the housing 12 preventing the easy removal of the piezoelectric crystal assembly 14 from the housing 12. In addition, because the arms 72 are deflected in a direction opposite to the direction of insertion of the retaining member 16 into the housing 12, the retaining member 16 applies a compressive force to the piezoelectric crystal assembly 14 resulting in the bottom surface 74 of the piezoelectric element 18 firmly engaging the surface defining the base portion 30 of the housing 12. In this way, a firm electrical and acoustical contact is formed between the bottom surface 74 of the piezoelectric element 18 and the surface defining the bottom portion 30 of the housing 12.

In addition to causing the formation of a firm electrical and acoustical contact between the piezoelectric element 18 and the base portion 30 of the housing 12, the retaining member 16 acts as a spring and absorbs mechanical shocks or vibrations to which the transducer 10 might be subjected. The retaining member 16 can also compensate for temperature changes or mechanical stresses to which the transducer 10 might be subjected. Lastly, the retaining member 16 can act as a support surface for any electronic components associated with the transducer 10 and placed within the area shown generally by the numeral 80 in housing 12. As previously stated, after the electronic components are placed within area 80, the housing 12 is filled with potting or epoxy material to protect the components and to absorb any acoustic signals which might pass through housing 12. In addition, the potting or epoxy material makes the housing 12 substantially hermetically sealed permitting the transducer 10 to be subjected to aggressive environments, high temperatures and high pressures without any adverse effects to the contents of the housing 12 or to the operation of the transducer 10.

Certain modifications and improvements will occur to those skilled in the art upon reading the foregoing. It should be understood that all such modifications and improvements have been deleted herein for the sake of conciseness and readability, but are properly within the scope of the following claims.

We claim:

1. An ultrasonic transducer comprising:

a housing;

a piezoelectric crystal assembly received within said housing, said piezoelectric assembly comprising a piezoelectric element, a backing member, and an insulating member interposed between said piezoelectric element and said backing member; and a retaining member received within said housing and contacting said piezoelectric crystal assembly, said retaining member grippingly engaging the surface defining said housing and applying a compressive force to said piezoelectric crystal assembly.

2. The ultrasonic transducer as defined in claim 1 wherein said housing comprises a base portion and a longitudinally extending portion connected to said base portion.

3. The ultrasonic transducer as defined in claim 2 wherein said piezoelectric element has a first surface and a second surface, said first surface of said piezoelectric element contacting said base portion of said housing.

4. The ultrasonic transducer as defined in claim 3 wherein said second surface of said piezoelectric element contacts said insulating member.

5. The ultrasonic transducer as defined in claim 2 wherein said retaining member contacts said longitudinally extending portion of said housing.

6. An ultrasonic transducer comprising:

a housing;

a piezoelectric crystal assembly received within said housing; and a retaining member received within said housing and contacting said piezoelectric crystal assembly, said retaining member comprising a hub portion contacting said piezoelectric crystal assembly and a plurality of arms emanating from said hub portion and contacting said housing, said retaining member grippingly engaging the surface defining said housing and applying a compressive force to said piezoelectric crystal assembly.

7. The ultrasonic transducer as defined in claim 6 wherein said arms emanate radially outwardly from said hub portion of said retaining member.

8. The ultrasonic transducer as defined in claim 6 wherein said arms are oriented relative to one another in a substantially angularly spaced-apart relationship.

9. The ultrasonic transducer as defined in claim 6 wherein the outer ends of said arms grippingly engage the inner surface of said housing.

10. The ultrasonic transducer as defined in claim 6 wherein said arms are positioned at an acute angle with respect to said hub portion of said retaining member.

11. The ultrasonic transducer as defined in claim 6 wherein said acute angle is such that the plane of said arms causes said hub portion of said retaining member to apply a compressive force to said piezoelectric crystal assembly.

* * * * *